Jan. 20, 1959  A. C. GREGORY  2,869,145
COMBINATION CRADLE, BASSINET AND BUGGY
Filed July 31, 1956  3 Sheets-Sheet 1

INVENTOR.
ARTHUR C. GREGORY
BY
McMorrow, Berman + Davidson
ATTORNEYS

Jan. 20, 1959     A. C. GREGORY     2,869,145
COMBINATION CRADLE, BASSINET AND BUGGY
Filed July 31, 1956     3 Sheets-Sheet 2
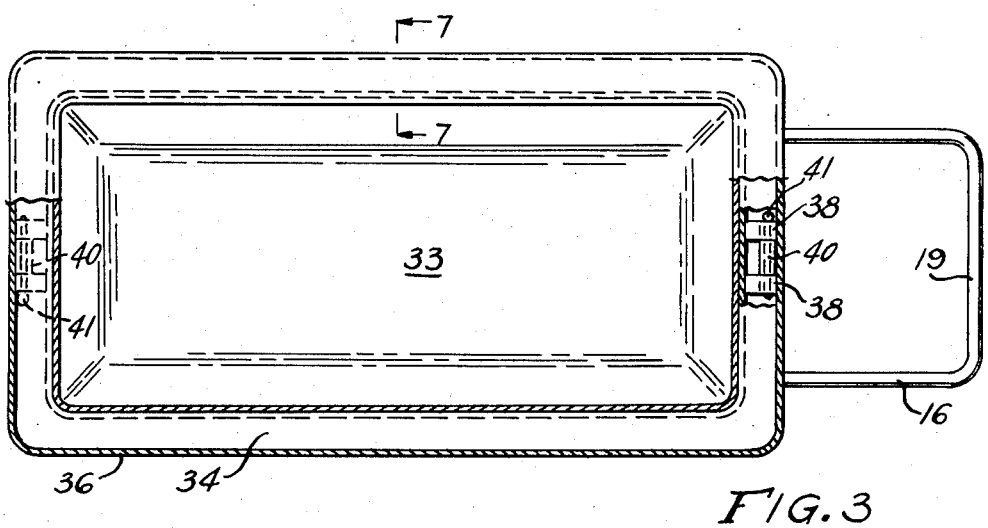
FIG. 3
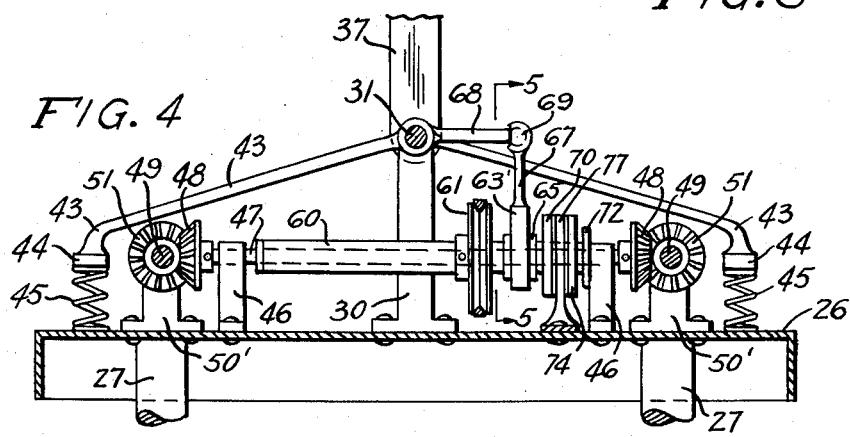
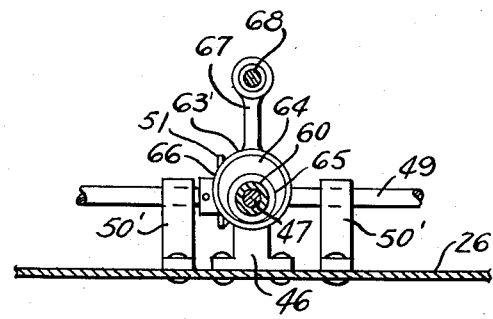
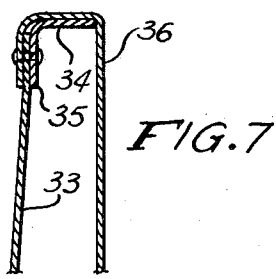
FIG. 7
FIG. 5
INVENTOR.
ARTHUR C. GREGORY
BY
McMorrow, Berman & Davidson
ATTORNEYS

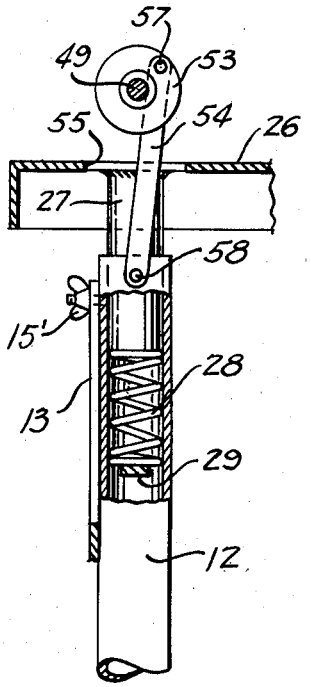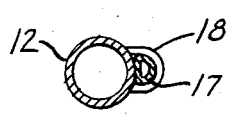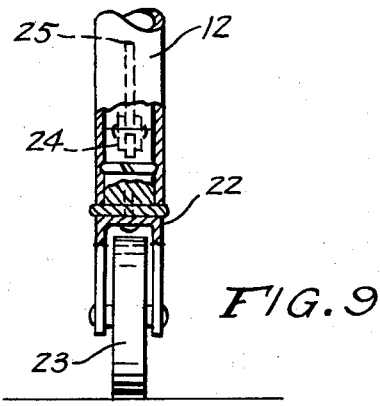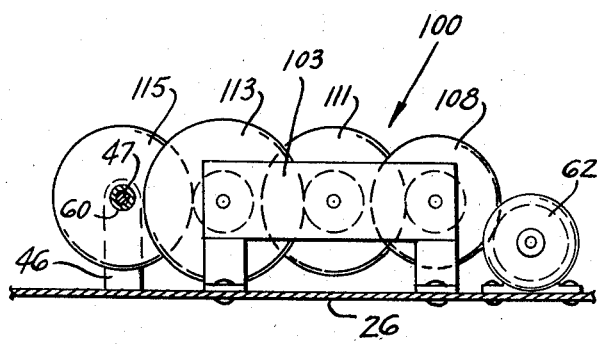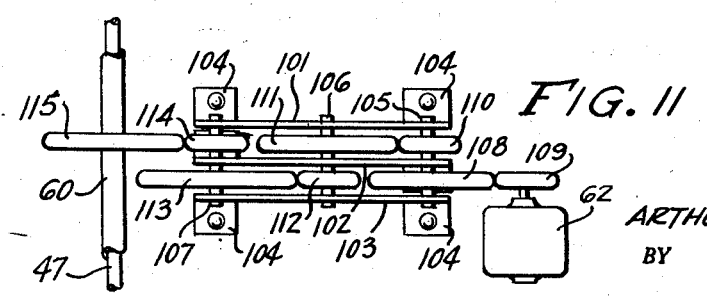

United States Patent Office 2,869,145
Patented Jan. 20, 1959

2,869,145

COMBINATION CRADLE, BASSINET AND BUGGY

Arthur C. Gregory, Grenada, Miss.

Application July 31, 1956, Serial No. 601,223

2 Claims. (Cl. 5—109)

This invention relates to cradle devices for infants, and more particularly to a combination cradle, bassinet and buggy which is adapted to be electrically operated.

A main object of the invention is to provide a novel and improved combination cradle, bassinet and buggy, the combination device being relatively simple in construction, being compact in size, and being neat in appearance.

A further object of the invention is to provide an improved combination cradle, bassinet and buggy wherein the device is adapted to be electrically driven in either one of two different modes off movement, namely, to be either vertically reciprocated or to be oscillated around a longitudinal horizontal axis, the device involving relatively inexpensive components, being durable in construction, being reliable in operation, and being arranged so that, if so desired, it may be placed in operation automatically at a desired time.

A still further object of the invention is to provide an improved electrically driven cradle which may be at times employed as a bassinet, and which may be further employed at times as a baby buggy, the device being provided with means for reciprocating or oscillating same electrically, when so desired, the parts of the device being readily detachable so that it may be employed for any selected purpose, namely, for use either as a cradle, as a bassinet, or, when completely assembled, as a baby buggy.

Further objects and advantages of the invention will become apparent from the following description and claims, and from the accompanying drawings, wherein:

Figure 3 is a horizontal cross sectional view taken substantially on line 3—3 of Figure 1 with a portion of the top rim of the bassinet element of the device being shown in plan view.

Figure 4 is an enlarged transverse vertical cross sectional view taken on the line 4—4 of Figure 2.

Figure 5 is a vertical cross sectional detail view taken on line 5—5 of Figure 4.

Figure 6 is an enlarged cross sectional detail view taken on line 6—6 of Figure 2.

Figure 7 is an enlarged cross sectional detail view taken on line 7—7 of Figure 3.

Figure 8 is an enlarged cross sectional detail view taken on line 8—8 of Figure 1.

Figure 9 is an enlarged cross sectional detail view taken on line 9—9 of Figure 1.

Figure 10 is a longitudinal, fragmentary, vertical cross sectional view taken through a portion of the table member of a modified form of combination cradle, bassinet and buggy device according to the present invention, showing a variation of a means for transmitting driving torque from the electric motor to the transverse shaft means of the device.

Figure 11 is a top plan view of the transmission means illustrated in Figure 10.

Figure 1:
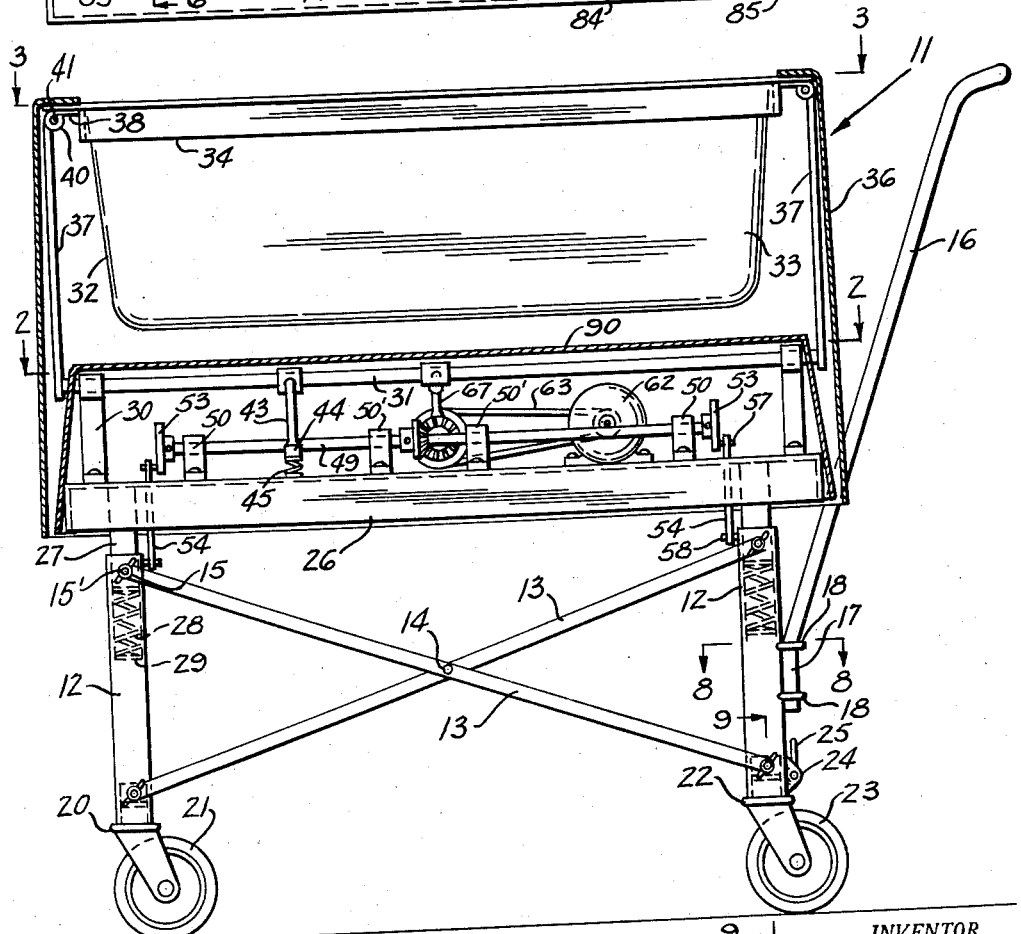
Figure 1 is a vertical longitudinal cross sectional view taken through a completely assembled combination cradle, bassinet and buggy device constructed in accordance with the present invention.

Referring to the drawings, and more particularly to Figures 1 to 9, 11 generally designates a combination cradle, bassinet and baby buggy, according to the present invention. The device 11 comprises base means consisting of respective pairs of tubular vertical legs 12, 12 which are interconnected by respective pairs of diagonal bars 13, 13 at the opposite sides of the device, each pair of diagonal bars 13 being connected together at their center portions, as by fastening elements 14 and being detachably secured at their ends to the top and bottom portions of the respective base legs 12, as by studs 15 provided on said top and bottom portions passing through apertures in the ends of the bars 13 and fastened thereon by wing nuts 15'. The front and rear legs 12 at each side of the device define a base frame, which includes a detachable, generally U-shaped upwardly and rearwardly inclined handle bar 16 having vertical end portions 17 detachably engaged in respective pairs of loops 18, 18 secured on the rear legs 12 in vertically spaced relationship, as shown in Figure 1.

The handle bar 16 has the transversely extending bight portion 19 at its top end, whereby the handle bar 16 may be employed in the same manner as the handle bar of a conventional baby buggy, but may be readily removed, when its use is not required, by disengaging the vertical lower end portions thereof from the respective pairs of loops 18, 18 on the rear legs 12, 12.

As will be readily understood, the diagonal bars 13 may be also easily detached from the legs 12 by merely disengaging the wing nuts 15' from their studs 15.

The front legs are provided with swivelly mounted casters 20 having the rotatable ground-engaging supporting wheels 21 journaled therein. The rear legs 12 are provided with similar casters 22 having the ground-engaging supporting wheels 23 journaled therein, and being arranged in vertical longitudinal planes, as shown in Figure 1, the rear casters 22 being provided with conventional locking means 24 including manually rotatable lever elements 25 which may be rotated clockwise, as viewed in Figure 1 toward locking positions, for example, toward horizontal positions wherein the wheels 23 are clampingly held against rotation, whereby the device may be at times locked in a stationary position. The details of the wheel-clamping means 24 are well known to those skilled in the art, and in themselves form no part of the present invention.

Designated at 26 is a generally rectangular table member which has rigidly secured thereto at its respective corner portions the vertical, depending post members 27 which are telescopically engaged in the respective tubular legs 12 and which are cushioned with respect to said legs by respective coil springs 28 mounted in the upper portions of the legs and supporting the post members 27 thereon. Any suitable means may be provided in the tubular legs 12 to support the bottom ends of the coil springs 28, for example, transverse pins 29 may be secured in the legs 12 to support the lower ends of the coil springs 28.

Secured to the intermediate portions of the transverse margins of table 26 are upstanding bearing brackets 30, 30, and journaled in the top portions of said bearing brackets is a longitudinally extending shaft member 31. Designated at 32 is a bassinet which comprises the main body of flexible fabric material 33, shaped to define a generally rectangular receptacle to receive an infant, the flexible receptacle 33 being provided at its rim with the rigid, generally rectangular supporting frame 34 extending completely around the periphery of the flexible body 33. As shown in Figure 7, the frame 34 may be of any suitable cross sectional shape, for example, may be of right angular cross sectional shape, to provide adequate stiffness thereof. Secured to the vertical depending flange 35 of the peripheral frame 34 in overlying relationship to the margin of the flexible receptacle 33 is a peripheral skirt member 36 of flexible material which extends over the frame 34, as shown in Figure 7, and extends downwardly for a length sufficient to cover the table 26, as shown in Figure 1. The skirt member 36 may be fabric, or of any suitable flexible material.

Rigidly secured to the ends of the longitudinal shaft 31 are the respective vertical upwardly extending bar members 37, 37 which are formed at their top ends with hinge loops received between respective pairs of hinge loops 38, 38 rigidly secured to the underside of the horizontal flange of frame 34 at the intermediate portions of the transverse ends, as shown in Figure 1. The hinge loops at the top ends of the bars 37, designated at 40, 40 in Figure 3, are detachably secured between the respective pairs of hinge loops 38, 38 by removable hinge pins 41, 41.

As will be readily understood, the bassinet 33 is connected to the shaft 31 so that said bassinet oscillates with the shaft. The oscillation of the bassinet 33 and the shaft 31 is cushioned by the provision of a pair of downwardly and outwardly inclined rod members 43, 43 rigidly secured to shaft 31 and provided at their outer ends with enlarged lug portions 44 to which are secured coil springs 45 engageable with the top surface of table 26 to limit the oscillation of the shaft 31 and to cushion the rocking movements of said shaft with respect to the table 26.

Mounted on the table 26 are the transversely aligned upstanding bearing brackets 46, 46 in which is journaled a transversely extending shaft 47 provided on its ends with the bevel gears 48, 48. Respective longitudinal shafts 49, 49 are journaled in longitudinally aligned, upstanding pairs of bearing brackets 50, 50 mounted on the table 26 and having bevel gears 51 secured to their intermediate portions which mesh with the respective bevel gears 48, as shown in Figure 4. Additional upstanding bearing brackets 50' are provided on the table 26 to support the intermediate portions of the shafts 49.

Secured to the opposite ends of each shaft 49 are the crank discs 53, 53, said crank discs being connected by detachable link bars 54 to the top portions of the respective legs 12, the link bars 54 extending through transverse slots 55 provided therefor in table 26. The link bars 54 engage at their opposite ends with respective pins 57 and 58 provided respectively on the crank discs 53 and the legs 12, and detachably secured thereto in any suitable manner. As will be readily understood, the link bars 54 may be detached from the pins 57, when desired, so that the table 26 may be lifted off the base legs 12 when the device is to be employed as a bassinet or as a cradle.

It will be readily apparent that when the transverse shaft 47 is rotated, it transmits torque to the longitudinal shafts 49, 49 through the bevel gears 48 and 51, whereby the end discs 53 rotate and develop a reaction with respect to the legs 12, through the connecting links 54, causing the table 26 to reciprocate vertically.

Rotatably mounted on the shaft 47 is a sleeve member 60 to which is secured a drive pulley 61. Mounted on the table 26 is an electric motor 62 whose shaft is provided with a pulley which is coupled to the drive pulley 61 by a belt 63. Rotatably mounted on the sleeve 60 is an eccentric assembly 63', said eccentric assembly comprising an eccentric disc 64 provided with the circular driving member 65 which is in rotatable engagement with the sleeve 60. Rotatably engaged on the eccentric disc is the ring 66 to which is rigidly secured the upwardly extending arm 67. Rigidly secured to the longitudinal shaft 31 is an outwardly extending arm 68 which is rotatably connected to the top end of the arm 67 by a ball and socket joint 69, said joint comprising a socket carried by the top end of the arm 67 and a ball received in said socket and rotatable therein, said ball being carried by the end of the arm 68.

Splined on the sleeve 60 adjacent the collar 65 is a clutch disc element 70 which is engageable with the collar 65 to rotate the eccentric disc 64 responsive to movement of the clutch disc 70 to the left from the position thereof shown in Figure 4.

Secured on the shaft 47 and rigid therewith is a flange 72, and splined on the sleeve 60 adjacent the flange 72 is a clutch collar 74 which, when moved to the right, as viewed in Figure 4, drivingly engages with the flange 72.

Figure 2:
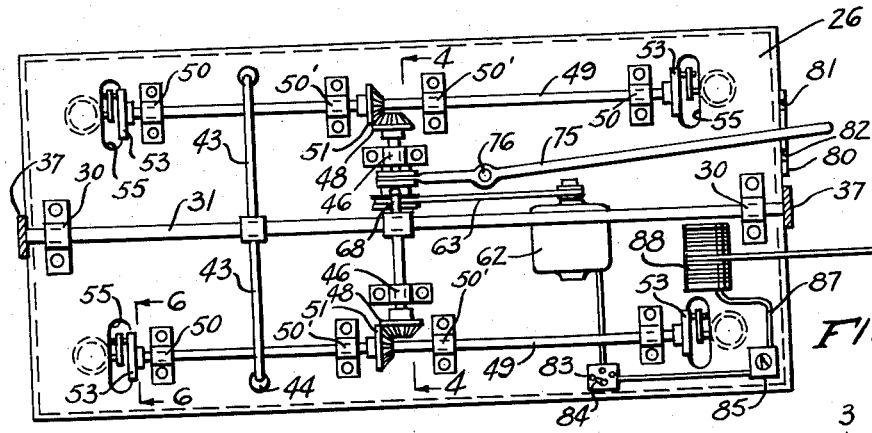
Figure 2 is a horizontal cross sectional view taken substantially on the line 2—2 of Figure 1 but omitting the flexible fabric covering element of the upper member of the device.

Designated at 75 is a clutch lever which is pivoted to the table 26 at 76, as shown in Figure 2, the clutch lever 75 being formed at its inner end with a yoke portion 77 extending between the clutch discs 70 and 74 and being effective to move said discs responsive to the rotation of the lever 75 either clockwise or counterclockwise, as viewed in Figure 2. When the clutch lever 75 is rotated clockwise, as viewed in Figure 2, the yoke portion 77 engages the clutch disc 74 and moves said clutch disc into driving engagement with the flange 72, causing shaft 47 to be rotated and thus causing the bassinet receptacle 33 to be reciprocated vertically by the crank linkages 53, 54, as above described. When the clutch lever 75 is rotated counterclockwise, as viewed in Figure 2, the yoke member 77 engages clutch disc 70 and moves said clutch disc into driving engagement with collar element 65, causing the eccentric disc 64 to be rotated and causing said disc 64 to transmit eccentric movement to arm 67 through ring 66, causing the arm 67 to be reciprocated vertically and causing the shaft 31 to be oscillated, since arm 68 follows the movements of the arm 67. As above explained, the oscillation of shaft 31 is transmitted to the bassinet receptacle 33, causing said receptacle to be oscillated with the shaft 31.

The lever 75 extends rearwardly over the table 26 and between the opposite end portions of a clutch-retaining bracket plate 80 secured to the rear edge of the table 26. The plate 80 is provided with respective lever-retaining notches 81 and 82 in which the lever 75 is lockingly engageable to retain the lever in either one of its positions, namely, in either the clockwise-rotated position thereof or the counterclockwise-rotated position thereof described above. The lever 75 may be positioned in a neutral position thereof, as shown in Figure 2, between the notches 81 and 82, in which position no driving force is transmitted from the sleeve 60 to either shaft 31 or to the shaft 47.

As will be well understood, the motor 62 may be controlled in any suitable manner, for example, may be provided with a multiple speed selecting switch 83, including suitable resistors which may be switched into the energizing circuit of motor 62, as by the operation of a speed-selecting arm 84 provided in the switch 83. This provides a choice of different rates of vertical reciprocation or of oscillation of the bassinet receptacle 33.

The motor 62 may also be provided with a time switch 85 which may be set, if so desired, to energize the motor at a predetermined time and to turn the motor off after a desired interval. The timer switch 85 is included in the line cord circuit of the motor 62, as shown in Figure 2. The line cord, shown at 87, is preferably carried on a spring-driven reel 88, whereby only a desired length of line cord may be employed, sufficient to connect the device to an available electrical receptacle, the surplus line cord being wound up on the spring-operated reel 88.

A suitable cover 90 of plastic material or other suitable rigid material is provided over the table 26 and the mechanical parts mounted thereon, as shown in Figure 1, the cover 90 being suitably notched or apertured to provide clearance for the end portions of shaft 31. The cover 90 may be suitably fastened to the side flanges of the table 26 so as to be held stationary with respect to said table 26.

Figures 10 and 11 illustrate an alternative power transmission means which may be employed in place of the belt 63 and the respective pulleys on the motor shaft and on sleeve 60 to transmit driving torque from the motor to the sleeve 60. The power transmission means of Figures 10 and 11 is designated generally at 100 and comprises the upstanding vertical plate members 101, 102 and 103, the plate members 101 and 103 being secured to the table 26 by suitable supporting lugs 104, as shown in Figure 11. Respective transverse shafts 105, 106 and 107 are journaled in the plates 101, 102, and 103. Mounted on the shaft 105 is a relatively large friction wheel 108 which is in frictional engagement with a smaller friction wheel 109 secured on the shaft of motor 62. Mounted on the shaft 105 is a smaller friction wheel 110 which is in frictional engagement with a relatively large friction wheel 111 mounted on the shaft 106. Mounted on shaft 106 is a smaller friction wheel 112 which is in frictional driving engagement with a relatively large friction wheel 113 mounted on shaft 107. Mounted on shaft 107 is a relatively small friction wheel 114 which is in frictional driving engagement with a relatively large friction wheel 115 mounted on the sleeve 60. As will be readily apparent, torque is transmitted to the respective frictionally engaging wheels 109 and 108, 110 and 111, 112 and 113, and 114, and 115, providing a substantial speed reduction, whereby the sleeve 60 is driven at a substantialy slower speed than the shaft of motor 62. Since the torque is transmitted by the frictional engagement of the respective friction wheels, the mechanism is yieldable, so that no damage thereto will occur if the movement of the cradle is temporarily restrained while the clutch lever 75 is in a coupling position.

The intermediate plate 102 is positioned in parallel relationship between the outer plates 101 and 103 in any suitable manner, for example, by the provision of fastening lugs at its lower end which may be secured to the underlying table surface.

While certain specific embodiments of an improved combination cradle, bassinet and buggy have been disclosed in the foregoing description, it will be understood that various modifications within the sprit of the invention will occur to those skilled in the art. Therefore it is intended that no limitations be placed on the invention except as defined by the scope of the appended claims.

What is claimed is:

1. In a cradle, a base, vertical guide means on said base, a table member, means on said table member slidably engaged with said vertical guide means to guide the table member for vertical reciprocation with respect to the base, a bassinet, respective depending arms at the opposite ends of said bassinet, transverse hinge loops at the top ends of said arms, cooperating hinge loops on the ends of said bassinet, removable transverse hinge pins engaged through the hinge loops on the arms and on the ends of the bassinet, a longitudinal horizontal shaft journaled on said table member, means rigidly connecting the lower ends of the arms to said shaft to support said bassinet on said table member for oscillation about the longitudinal horizontal axis of the shaft, oppositely extending arms on said longitudinal shaft extending adjacent said table member, cushioning springs secured to the ends of said last named arms and engaging said table member, a transverse shaft journaled on said table member, drive means on the table member, means for at times drivingly coupling said drive means to said transverse shaft, respective longitudinal shafts journaled on the opposite side marginal portions of said table member and extending adjacent said base, respective crank linkages coupling the ends of said last named longitudinal shafts to said base and being formed and arranged to at times reciprocate said table member vertically responsive to the energization of the drive means, and crank means formed and arranged to couple said transverse shaft to said first named longitudinal shaft and being formed and arranged to at other times oscillate said first named longitudinal shaft responsive to the energization of the drive means.

2. In a cradle, a generally rectangular base, vertical legs at the corners of said base, respective supporting wheels journaled to the lower ends of said legs, a table, depending means on said table slidably engageable with said vertical legs to guide the table for vertical reciprocation with respect to said base, spring means cushioning vertical movement of the table with respect to said legs, a bassinet, respective depending arms at the opposite ends of said bassinet, transverse hinge loops at the top ends of said arms, cooperating hinge loops on the ends of said bassinet, removable transverse hinge pins engaged through the hinge loops on the arms and on the ends of the bassinet, a longitudinal horizontal shaft journaled to said table, means rigidly connecting the lower ends of the arms to said shaft to support said bassinet on said table for oscillation about the longitudinal horizontal axis of the shaft, oppositely extending arms on said longitudinal shaft extending adjacent said table, cushioning springs secured to the ends of said last named arms and engaging said table, a transverse shaft journaled on said table, drive means on the table, means for at times drivingly coupling said drive means to said transverse shaft, respective longitudinal shafts journaled on the opposite side marginal portions of said table and extending adjacent said base, respective crank linkages coupling the ends of said last named longitudinal shafts to said legs and being formed and arranged to at times reciprocate said table vertically responsive to energization of the drive means, and crank means formed and arranged to couple said transverse shaft to said first named longitudinal shaft and being formed and arranged to at other times oscillate said first named longitudinal shaft responsive to the energization of the drive means.

References Cited in the file of this patent

UNITED STATES PATENTS

| | | |
|---|---|---|
| 1,303,930 | Lucas | May 20, 1919 |
| 1,354,907 | Hopaidaszka | Oct. 5, 1920 |
| 1,483,813 | Jackson | Feb. 12, 1924 |
| 1,521,790 | Prescott | Jan. 6, 1925 |
| 1,662,754 | Millard | Mar. 13, 1928 |
| 1,991,001 | Reynolds | Feb. 12, 1935 |
| 2,349,837 | Wettlaufer | May 30, 1944 |

FOREIGN PATENTS

| | | |
|---|---|---|
| 66,359 | Norway | June 21, 1943 |
| 269,940 | Switzerland | Nov. 1, 1950 |